United States Patent
Jain et al.

(10) Patent No.: US 11,934,369 B2
(45) Date of Patent: Mar. 19, 2024

(54) FRAMEWORK FOR NESTED PROBABILISTIC DATA STRUCTURES AS A SERVICE FOR BIG DATA ANALYTICS

(71) Applicant: SAP SE, Walldorf (DE)

(72) Inventors: Shashank Mohan Jain, Karnataka (IN); Suchin Chouta, Udopi (IN)

(73) Assignee: SAP SE, Walldorf (DE)

( * ) Notice: Subject to any disclaimer, the term of this patent is extended or adjusted under 35 U.S.C. 154(b) by 165 days.

(21) Appl. No.: 17/453,510

(22) Filed: Nov. 4, 2021

(65) Prior Publication Data
US 2023/0135042 A1     May 4, 2023

(51) Int. Cl.
*G06F 16/22* (2019.01)
*G06F 16/23* (2019.01)
*G06F 16/242* (2019.01)
*G06F 16/25* (2019.01)

(52) U.S. Cl.
CPC ...... *G06F 16/2255* (2019.01); *G06F 16/2358* (2019.01); *G06F 16/2379* (2019.01); *G06F 16/244* (2019.01); *G06F 16/256* (2019.01)

(58) Field of Classification Search
CPC ............. G06F 16/2255; G06F 16/2379; G06F 16/256; G06F 16/244; G06F 16/2358
See application file for complete search history.

(56) References Cited

U.S. PATENT DOCUMENTS

| | | | |
|---|---|---|---|
| 6,470,333 B1 * | 10/2002 | Baclawski | G06F 16/2255 707/999.005 |
| 10,592,506 B1 * | 3/2020 | Thombre | G06F 16/2453 |
| 2014/0258266 A1 * | 9/2014 | Cruanes | G06F 16/24542 707/718 |
| 2018/0267980 A1 * | 9/2018 | Neria | G06F 16/181 |
| 2019/0361842 A1 * | 11/2019 | Wood | G06V 30/418 |
| 2020/0257684 A1 * | 8/2020 | Erlandson | G06F 16/2255 |
| 2021/0064592 A1 * | 3/2021 | Yao | G06F 16/2477 |

\* cited by examiner

*Primary Examiner* — Van H Oberly
(74) *Attorney, Agent, or Firm* — Buckley, Maschoff & Talwalkar LLC

(57) ABSTRACT

A system may include a nested probabilistic data structure that contains nested tables, each table having electronic records associated with different hash functions. A data analytics engine may receive information about a detected action, including action characteristics. In response to the detected action, insertions are executed into the nested probabilistic data structure at multiple levels based on the action characteristics (each insertion incrementing an entry in the data structure selected using the hash functions). The engine then continues to monitor for detected actions. Upon receipt of a query associated with the monitored action (including a query type), a key and level of nesting associated with the query is determined based on the query type. The hash functions are executed on the determined key to retrieve a value from each electronic record in an appropriate nested table, and a minimum of the retrieved values is output in response to the query.

15 Claims, 20 Drawing Sheets

KEY: HOUR OF DAY + DAY + MONTH + YEAR (HOUR 11 → 12, JANUARY 21, 2021)

| HOUR OF DAY | H1 | 0 | 0 | 0 | 0 | 0 | 0 | 0 | 0 | 0 |
|---|---|---|---|---|---|---|---|---|---|---|
| DAY | H2 | 0 | 0 | 0 | 0 | 0 | 0 | 0 | 0 | 0 |
| MONTH | H3 | 0 | 0 | 0 | 0 | 0 | 0 | 0 | 0 | 0 |
| YEAR | H4 | 0 | 0 | 0 | 0 | 0 | 0 | 0 | 0 | 0 |

*FIG. 9*

FRAMEWORK FOR NESTED PROBABILISTIC DATA STRUCTURES AS A SERVICE FOR BIG DATA ANALYTICS

BACKGROUND

An enterprise may use on-premises systems and/or a cloud computing environment to run applications and/or to provide services. For example, cloud-based applications may be used to process purchase orders, handle human resources tasks, interact with customers, etc. In many domains (e.g., Application Programming Interface ("API") management, Internet of Things ("IoT"), etc.), big data analytics can help understand how the cloud computing environment is operating. For example, in API management, an operator might want to track commit counts for Github based on time, repositories, committers, etc. Typical analytics (e.g., aggregation and averaging) on big data are performed either by storing everything in a columnar storage or using a distributed framework, such as MapReduce (e.g., Hadoop and spark) to perform calculations.

In the API management domain, for example, data records may store tenant identifiers (representing a tenant), proxy names (representing the API proxy via which the client requests are forwarded), an API Uniform Resource Locator ("URL") (the target API and URL where the proxy forwards the request, and a number of hits (the count for each record). Traditionally, this information might be collected and stored for six months or a year. However, such an approach can result in substantial storage costs (e.g., 100 million records might need to be stored). Moreover, the serving of a query can take a substantial amount of time because the system needs to fire different group by queries (e.g., get the hits for a particular API and for a specific tenant for an hour). Note that this is a time-consuming process because the database engine will need to process all of the records across the complete storage. According to some embodiments described herein, the concept of nested probabilistic data structures may be used to help these types of problems. It is desirable to automatically perform big data analytics for a cloud computing environment in an efficient and accurate manner.

SUMMARY

According to some embodiments, methods and systems may perform big data analytics for a cloud computing environment in an efficient and accurate manner. The system may include a nested probabilistic data structure that contains nested tables, each table having electronic records associated with different hash functions. A data analytics engine may receive information about a detected action, including action characteristics. In response to the detected action, insertions are executed into the nested probabilistic data structure at multiple levels based on the action characteristics (each insertion incrementing an entry in the data structure selected using the hash functions). The engine then continues to monitor for detected actions. Upon receipt of a query associated with the monitored action (including a query type), a key and level of nesting associated with the query is determined based on the query type. The hash functions are executed on the determined key to retrieve a value from each electronic record in an appropriate nested table, and a minimum of the retrieved values is output as a response to the query.

Some embodiments comprise: means for receiving, by a computer processor of a data analytics engine that monitors an action, information about a detected action performed in a cloud computing environment, including action characteristics; in response to the detected action, means for executing insertions into a nested probabilistic data structure at multiple levels based on the action characteristics, each insertion incrementing an entry in the nested probabilistic data structure selected using the hash functions, wherein the nested probabilistic data structure contains nested tables, each table having electronic records associated with different hash functions; means for continuing to monitor the cloud computing environment for detected actions; means for receiving a query associated with the monitored action, including a query type; means for determining a key and level of nesting associated with the query based on the query type; means for executing the hash functions on the determined key to retrieve a value from each electronic record in an appropriate nested table; and means for outputting a minimum of the retrieved values as a response to the query.

Some technical advantages of some embodiments disclosed herein are improved systems and methods associated with performing big data analytics for a cloud computing environment in an efficient and accurate manner.

BRIEF DESCRIPTION OF THE DRAWINGS

FIGS. 9 through 13 illustrate a first insertion process in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
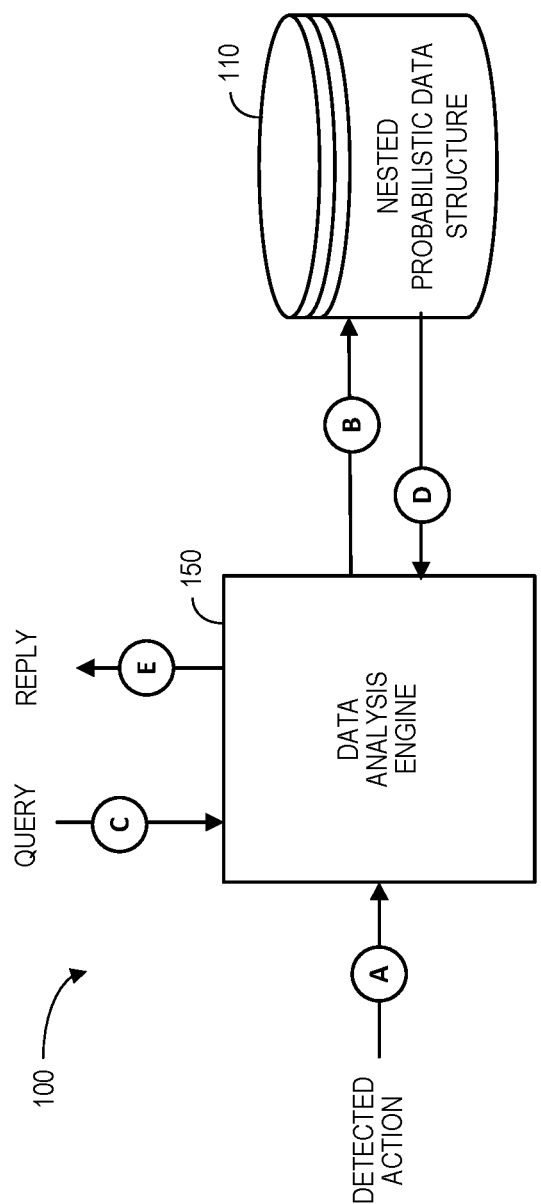
FIG. 1 is a high-level architecture for a system in accordance with some embodiments.

FIG. 1 is a high-level block diagram of a system 100 according to some embodiments. At (A), a data analysis engine 150 receives information about a detected action (e.g., a big data action being monitored by the system). At (B), the data analysis engine 150 may update a nested probabilistic data structure 110 based on the received indication and then continue monitoring for detected action. As used herein, the phrase "probabilistic data structure" may refer to one of a group of data structures that are useful in connection with big data and streaming applications. These data structures may use hash functions to randomize and compactly represent a set of items. Collisions may be ignored, but errors are well-controlled under a known threshold. Compared to error-free approaches, these data structures may use substantially less memory and have a constant query time.

At (C), the data analysis engine 150 may receive a query (e.g., asking how many actions were detected in a given period of time). Based on the details of the query, the data analysis engine 150 automatically accesses information in the nested probabilistic data structure 110 at (D). A used herein, the term "automatically" may refer to a device or process that can operate with little or no human interaction. A reply to the query is then output by the data analysis engine 150 at (E). Note that separate elements of the system 100 might instead be used to update and retrieve information from the nested probabilistic data structure 110 (instead of a single data analysis engine 150).

According to some embodiments, devices, including those associated with the system 100 and any other device described herein, may exchange data via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store data into and/or retrieve data from various data stores (e.g., the nested probabilistic data structure 110), which may be locally stored or reside remote from the data analysis engine 150. Although a single data analysis engine 150 is shown in FIG. 1, any number of such devices may be included. Moreover, various devices described herein might be combined according to embodiments of the present invention. For example, in some embodiments, the data analysis engine 150 and the nested probabilistic data structure 110 might comprise a single apparatus. Some or all of the system 100 functions may be performed by a constellation of networked apparatuses, such as in a distributed processing or cloud-based architecture.

An operator (e.g., a database administrator) may access the system 100 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to set up or adjust various mapping relationships) and/or provide or receive automatically generated recommendations, results, and/or alerts from the system 100.

Figure 2:
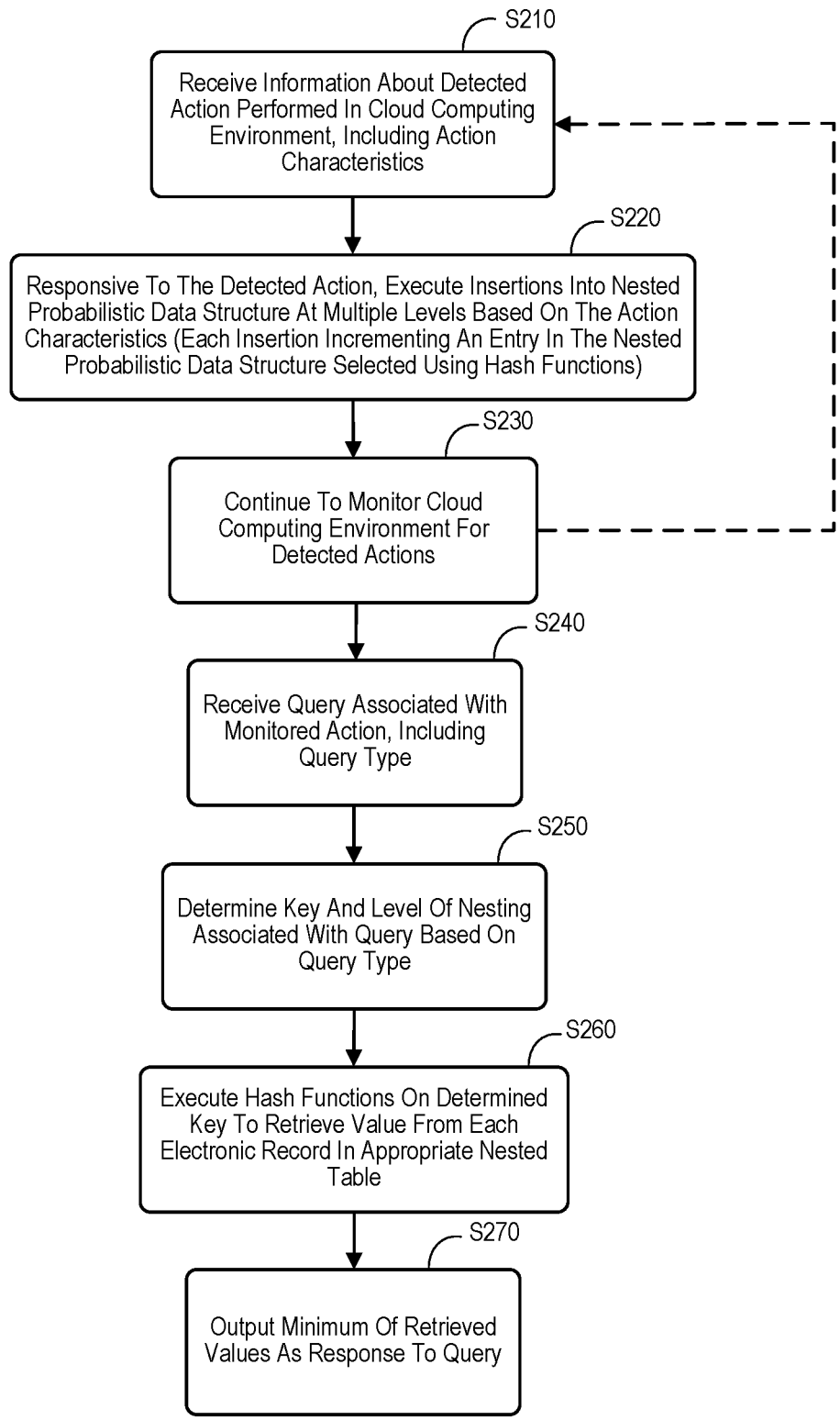
FIG. 2 illustrates a method according to some embodiments.

FIG. 2 illustrates a method to perform big data analytics for a cloud computing environment in an efficient and accurate manner according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, a computer processor (e.g., of a data analytics engine that monitors an action) may receive information about a detected action performed in the cloud computing environment. The monitored action might be associated with, for example, commit counts, commit counts based on time, commit counts based on committer, commit counts based on repository, an IoT-like domain, an API management domain, a re-usable, multi-domain service, etc. The information about a detected action performed in the cloud computing environment may include action characteristics, such as a tenant name, a proxy name, an API name, a date, a number of hits, etc. According to some embodiments, the monitored action may be subject to data analytics, such as data aggregation and/or data averaging. In response to the detected action, at S220 the system may execute insertions into a nested probabilistic data structure at multiple levels based on the action characteristics. The nested probabilistic data structure may, according to some embodiments, contain nested tables, each table having electronic records associated with different hash functions. As described in connection with FIGS. 4 through 14, each insertion may increment an entry in the nested probabilistic data structure selected using the hash functions. At S230, the system may continue to monitor the cloud computing environment for detected actions (e.g., as illustrated by the dashed arrow in FIG. 2).

At S240, the system may receive a query associated with the monitored action, including a query type. At S250, a key and level of nesting associated with the query may then be determined based on the query type. At S260, the system executes the hash functions on the determined key to retrieve a value from each electronic record in an appropriate nested table. At S270, a minimum of the retrieved values may then be output as a response to the query (e.g., providing a probabilistic estimate of the information requested in the received query).

Figure 3:
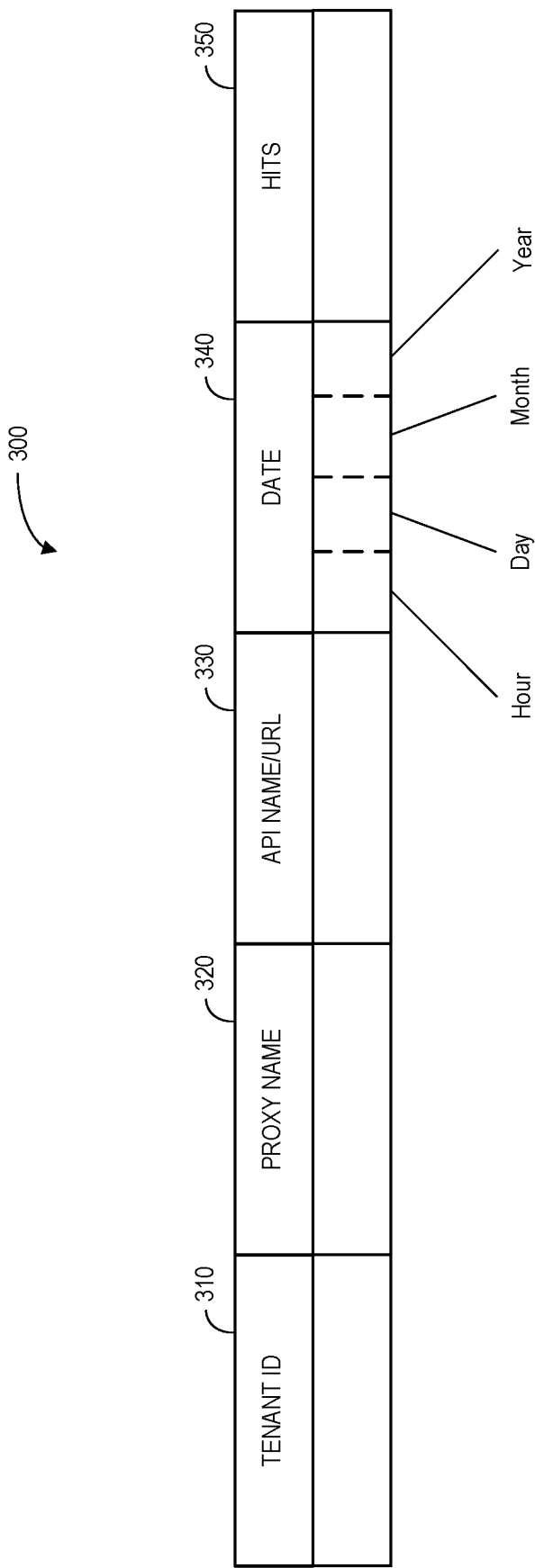
FIG. 3 is an Application Programming Interface ("API") management domain record representation in accordance with some embodiments.

Consider as an example API Management as a domain (but embodiments are not limited to that domain), where FIG. 3 is an API management domain record 300 representation in accordance with some embodiments. The tenant identifier 310 represents the tenant, the proxy name 320 represents the API proxy via which the client requests are forwarded, the API name/URL 330 is the target API name and URL where the proxy forwards the request, the date 340 indicates when the request occurred, and hits 350 represent the count for that record 300. Traditionally, this information may be monitored stored for six months or a year, which can lead to two major issues:

(1) big storage costs are involved when 100 million records 300 are stored in the table, and (2) serving a query takes substantial time as the system fires different group by queries (e.g., get the hits for an API and for a specific tenant for an hour), which can be a time-consuming process because the database engine must process records 300 across the complete storage (and end up doing sequential scans for aggregations).

Note that these kind of problems can occur in various domains, such as when the system wants to count commit counts for Github based on time, repositories, committers, etc. and the IoT-like domains.

According to some embodiments, the system may compromise a relatively small amount of accuracy to achieve a high degree of compression. To do so, embodiments may use a nested probabilistic data structure such as "count-min sketch" to achieve highly compressed storage and to make the query lookup as O(1) for the fast retrieval of results. As used herein, the phrase "count-min sketch" may refer to a probabilistic data structure that serves as a frequency table (or sketch) of events in a stream of data. The sketch uses hash functions to map events to frequencies. Unlike a hash table, the count-min sketch uses sublinear space (at the expense of overcounting some events due to collisions). A count-min sketch typically has a sublinear number of cells, related to the desired approximation quality of the sketch. Note that a goal of count-min sketch is to consume a stream of events, one at a time, and count the frequency of the different types of events in the stream. The sketch can be queried for the frequency of a particular event type i from a universe of event types U. The sketch will then return an estimate of this frequency that is within a certain distance of the true frequency (with a certain probability).

The sketch data structure may be a two-dimensional array of w columns and d rows. The parameters w and d are fixed when the sketch is created and determine the time and space needs and the probability of error when the sketch is queried for a frequency. Associated with each of the d rows is a separate hash function (pairwise independent hash functions). The parameters w and d can be chosen by setting w=[e/ε] and d=[ln 1/δ], where the error in answering a query is within an additive factor of ε with probability 1−δ and e is Euler's number.

When a new event of type i arrives, the sketch is updated as follows: for each row j of the table, apply the corresponding hash function to obtain a column index k=$h_j(i)$. Then increment the value in row j, column k by one. Note that given two streams, constructing a sketch on each stream and summing the sketches yields the same result as concatenating the streams and constructing a sketch on the concatenated streams. This may make the sketch mergeable and appropriate for use in distributed settings in addition to streaming ones.

Taking the same example record 300 shown in FIG. 3 for API management, note that the date 340 has four columns that can provide different levels of nesting. In particular, the date 340 includes: an hour, a day, a month, and a year. As a result, there are four different level of nesting structures which are possible.

Figure 4:
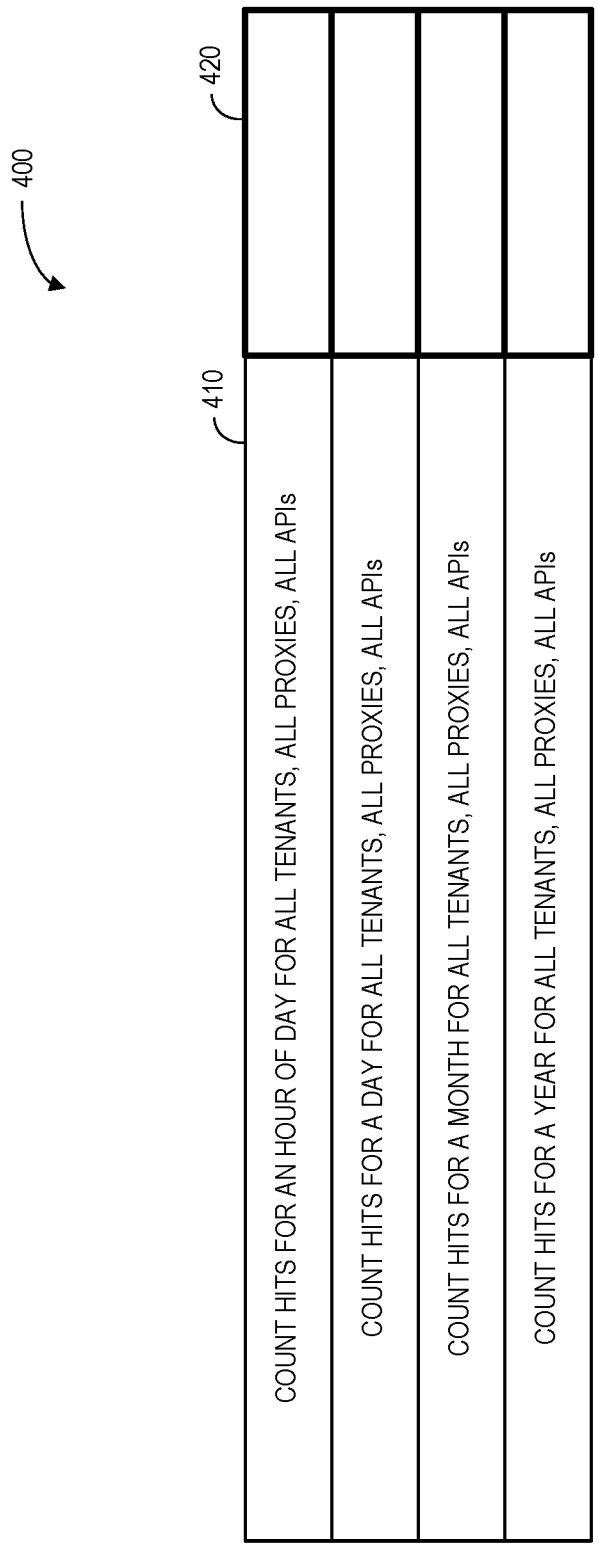
FIG. 4 is a first level of nesting structure according to some embodiments.

FIG. 4 is a first level of nesting structure 400 according to some embodiments. The structure 400 includes several types of information 410 and associated count hit values 420: count hits for an hour of day for all tenants, all proxies, all APIs; count hits for a day for all tenants, all proxies, all APIs; count hits for a month for all tenants, all proxies, all APIs; count hits for a year for all tenants, all proxies, all APIs.

Figure 5:
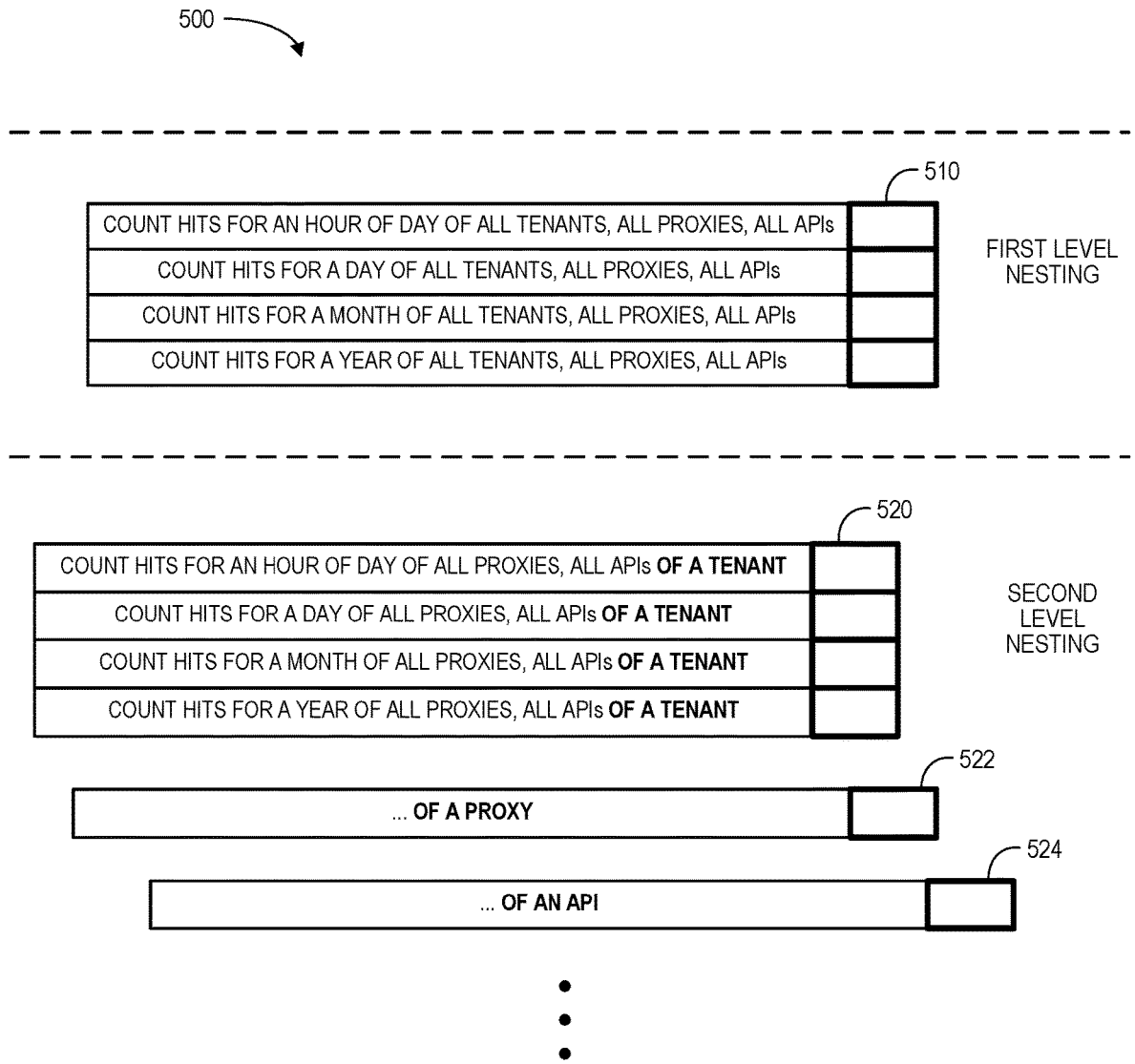
FIG. 5 illustrates nesting relationships in accordance with some embodiments.

Note that the structure represents only one level of nesting and embodiments may use multiple levels of nesting. For example, FIG. 5 illustrates 500 nesting relationships in accordance with some embodiments. In particular, a first level of nesting includes a table 510 while a second level of nesting includes multiple tables 520, 522, 524 (e.g., a table 520 "for a tenant," a table 522 "for a proxy," a table "for an API," etc.). This can be repeated for further levels of nesting.

Figure 6:
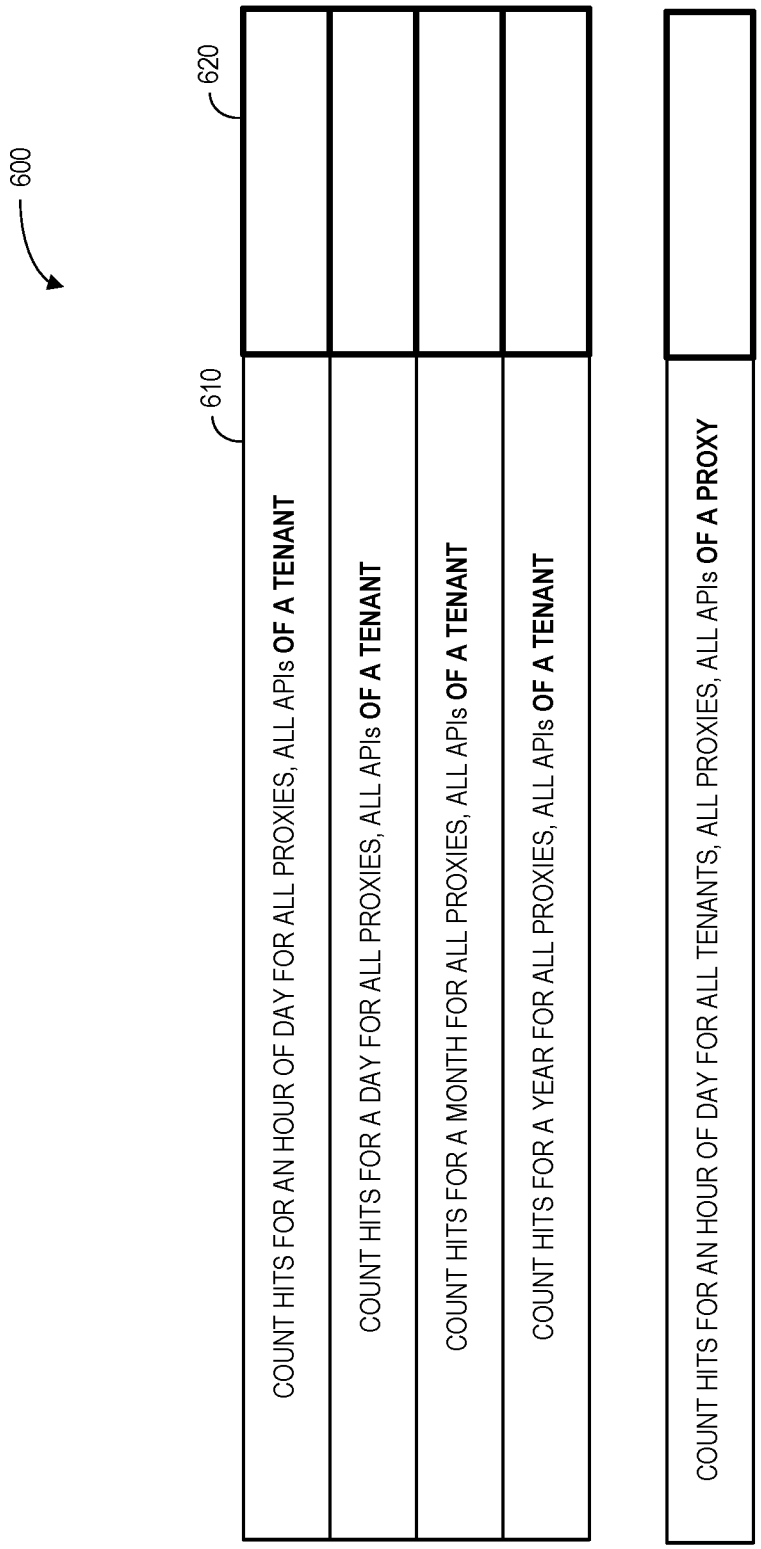
FIG. 6 is a second level of nesting structure according to some embodiments.

For example, FIG. 6 is a second level of nesting structure 600 according to some embodiments. The structure 600 includes several types of information 610 and associated count hit values 620: count hits for an hour of day of all proxies, for all APIs of a tenant; count hits for a day of all proxies, for all APIs of a tenant; and count hits for a month of all proxies, of all APIs of a tenant. An additional structure may represent count hits for a year of all proxies, of all APIs of a tenant; and count hits for an hour of day of all tenants, of all APIs of a proxy (e.g., when a proxy is shared between tenants).

Figure 7:
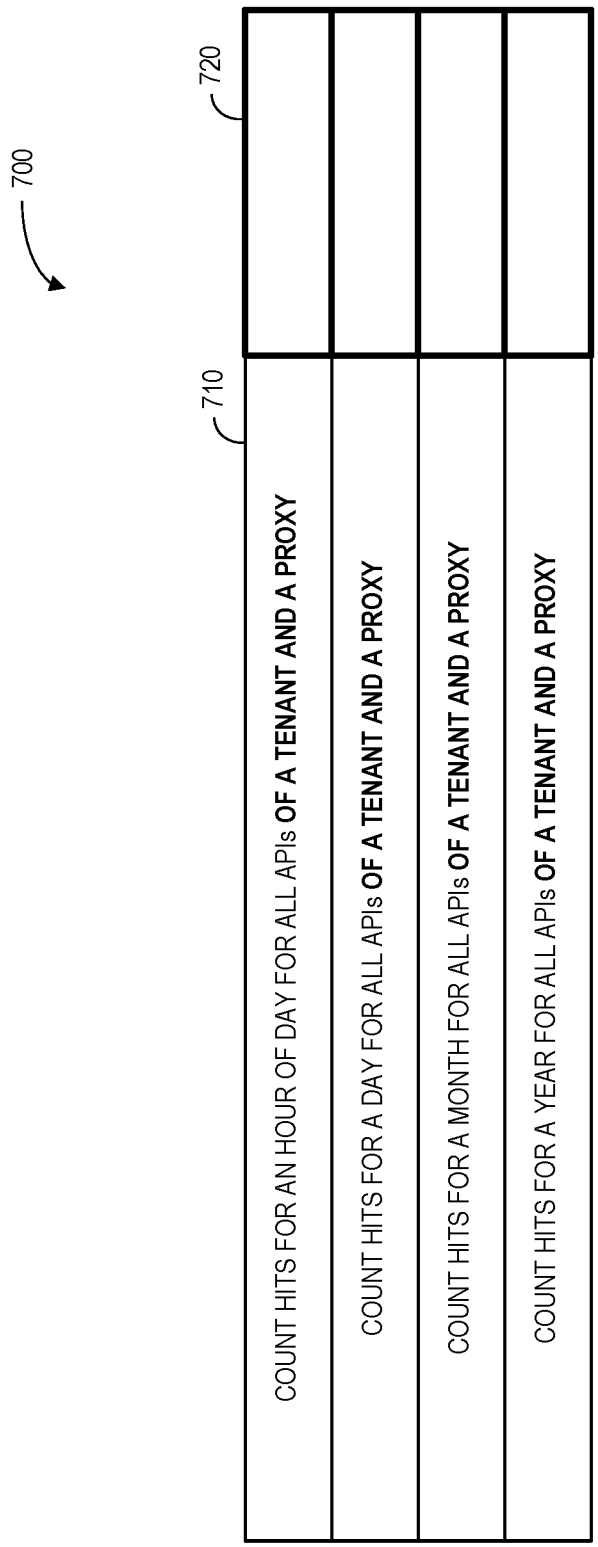
FIG. 7 is a third level of nesting structure in accordance with some embodiments.
Figure 8:
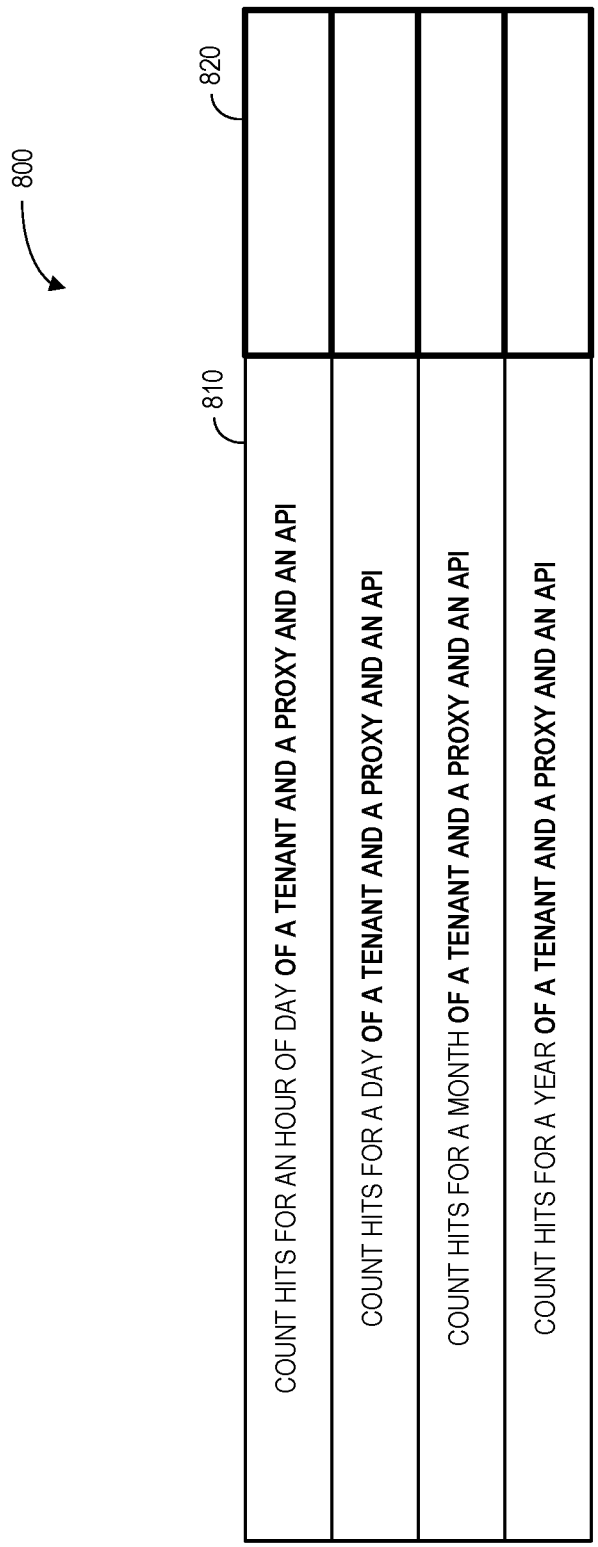
FIG. 8 is a fourth level of nesting structure according to some embodiments.

FIG. 7 is a third level of nesting structure 700 in accordance with some embodiments. The structure 700 includes several types of information 710 and associated count hit values 720: count hits for an hour of day of all APIs of a tenant and a proxy; count hits for a day of all APIs of a tenant and a proxy; count hits for a month of all APIs of a tenant and a proxy; and count hits for a year of all APIs of a tenant and a proxy. Similarly, FIG. 8 is a fourth level of nesting structure 800 according to some embodiments. The structure 800 includes several types of information 810 and associated count hit values 820: count hits for an hour of day of a tenant and a proxy and an API; count hits for a day of a tenant and a proxy and an API; count hits for a month of a tenant and a proxy and an API; and count hits for a year of a tenant and a proxy and an API.

Once these structures are defined for each nesting within a nesting type, a count-min sketch 900 may be created as illustrated in FIG. 9. This nested probabilistic data structure represents nested count-min sketch tables that use a different hashing algorithm for each row (H1, H2, H3, and H4) to index items via a modulo operation into one of nine specific columns (with nine columns being just an example representation and the actual number may vary as per requirements). Note that the hash functions H1, H2, H3, and H4 may comprise pairwise independent hash functions. Consider, for example, the first level of nesting as illustrated in FIG. 4 that includes the storage of hits for an hour of day for all tenants, all proxies, and all APIs. Initially all table elements in the sketch rows are populated with "0."

In this example, the key which is to be indexed is a combination of:

hour of day+day+month+year.

This key is then hashed by all four hashing algorithms which will give a different index entry for an item in the specific row. Each time there is a new insertion or collision, the value in the table element is incremented by adding one to the existing entry in that specific row and column.

Figure 10:
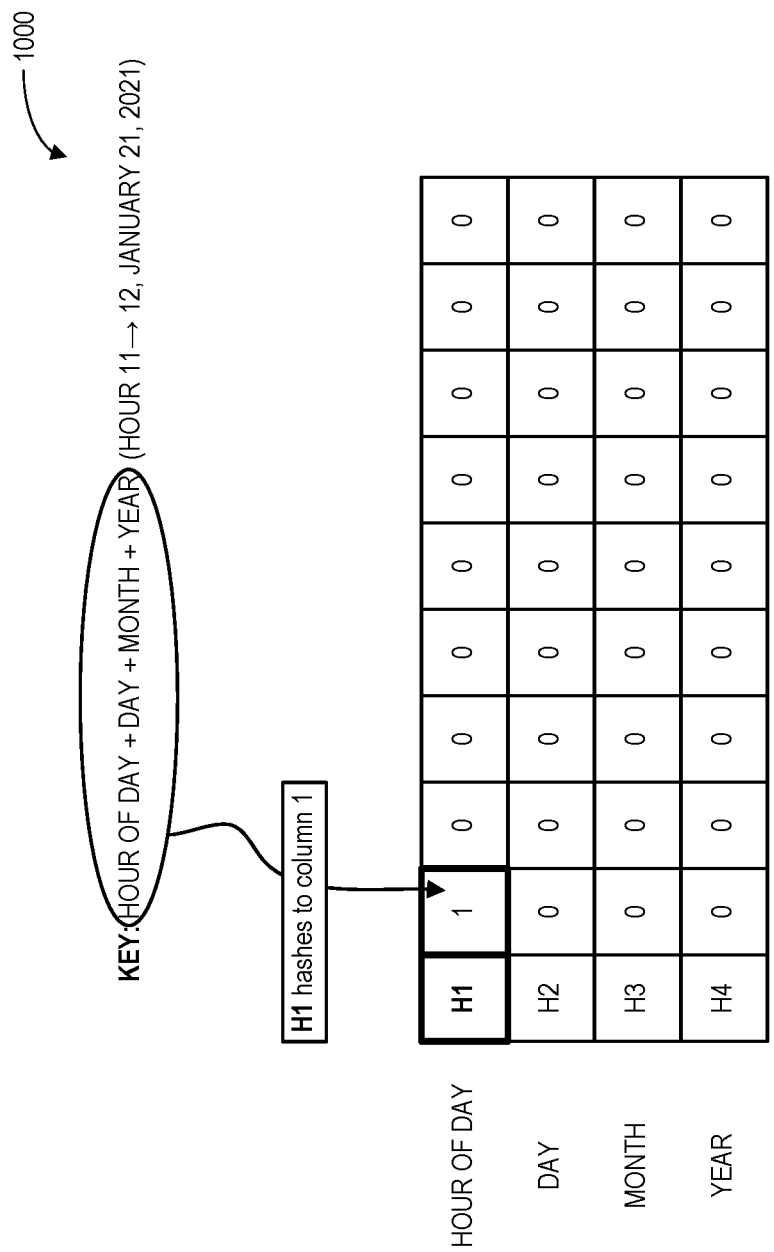
Figure 11:
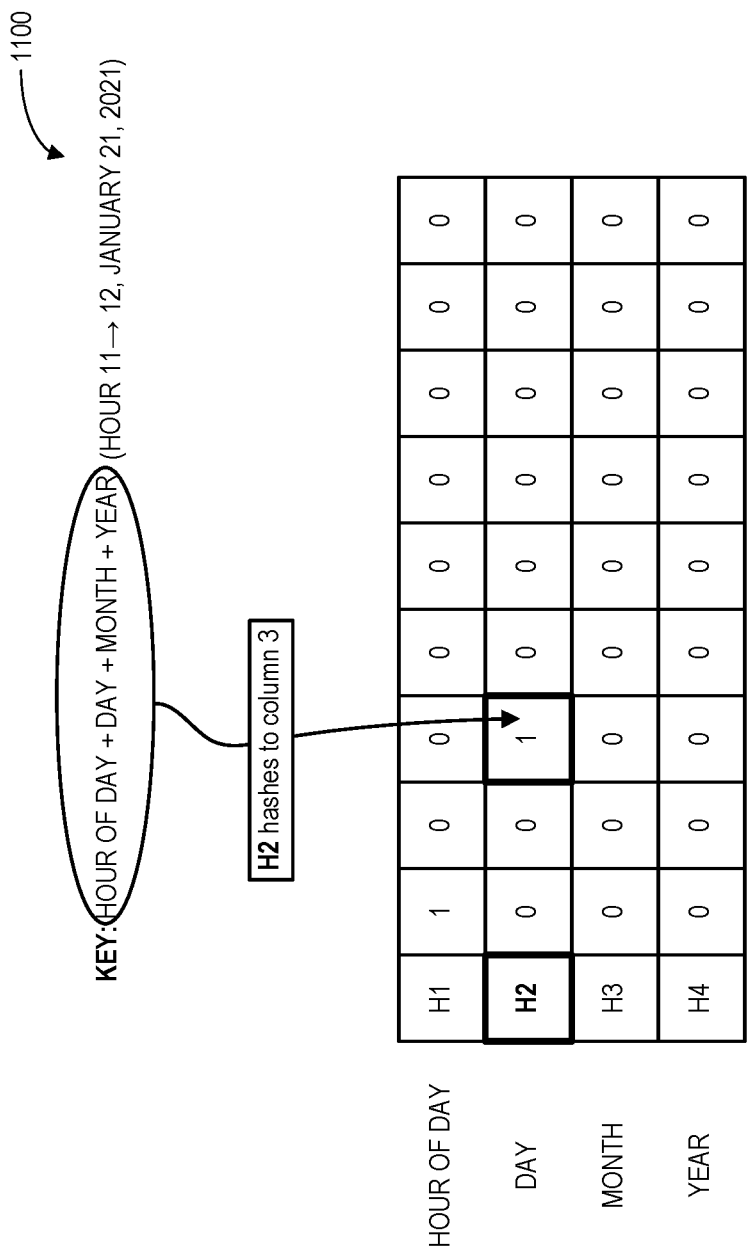
Figure 12:
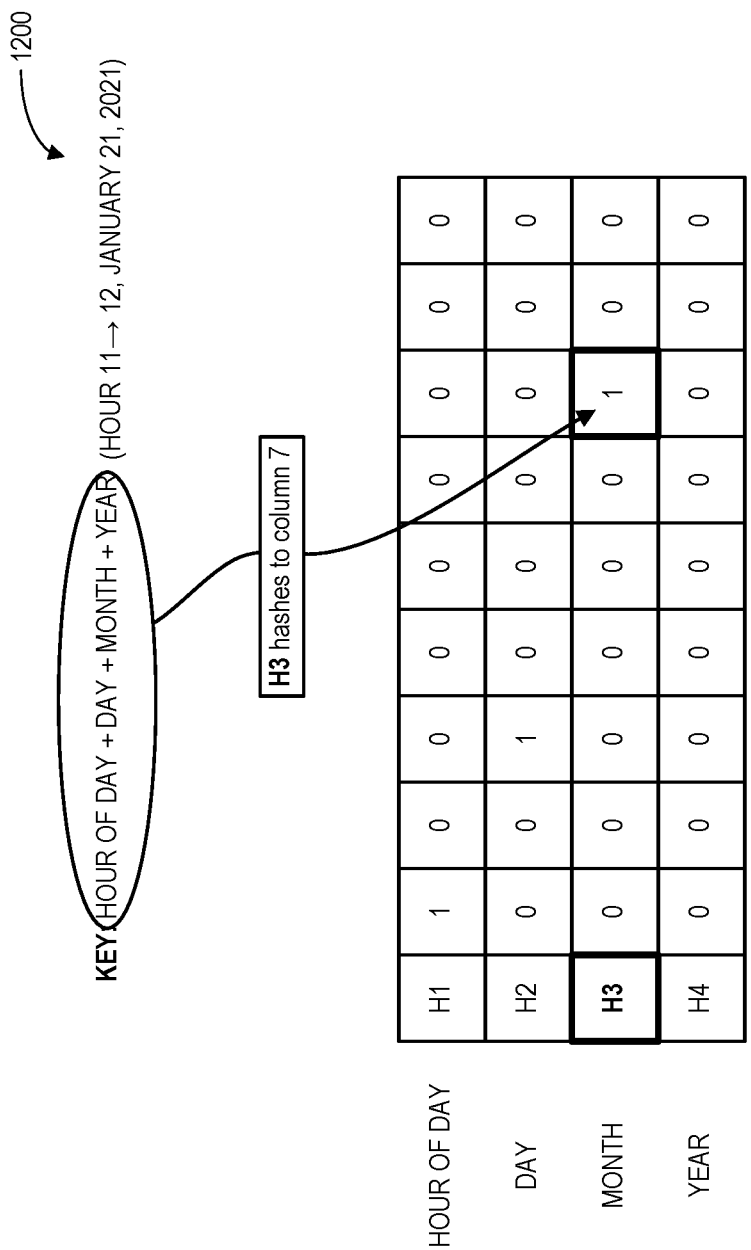
Figure 13:
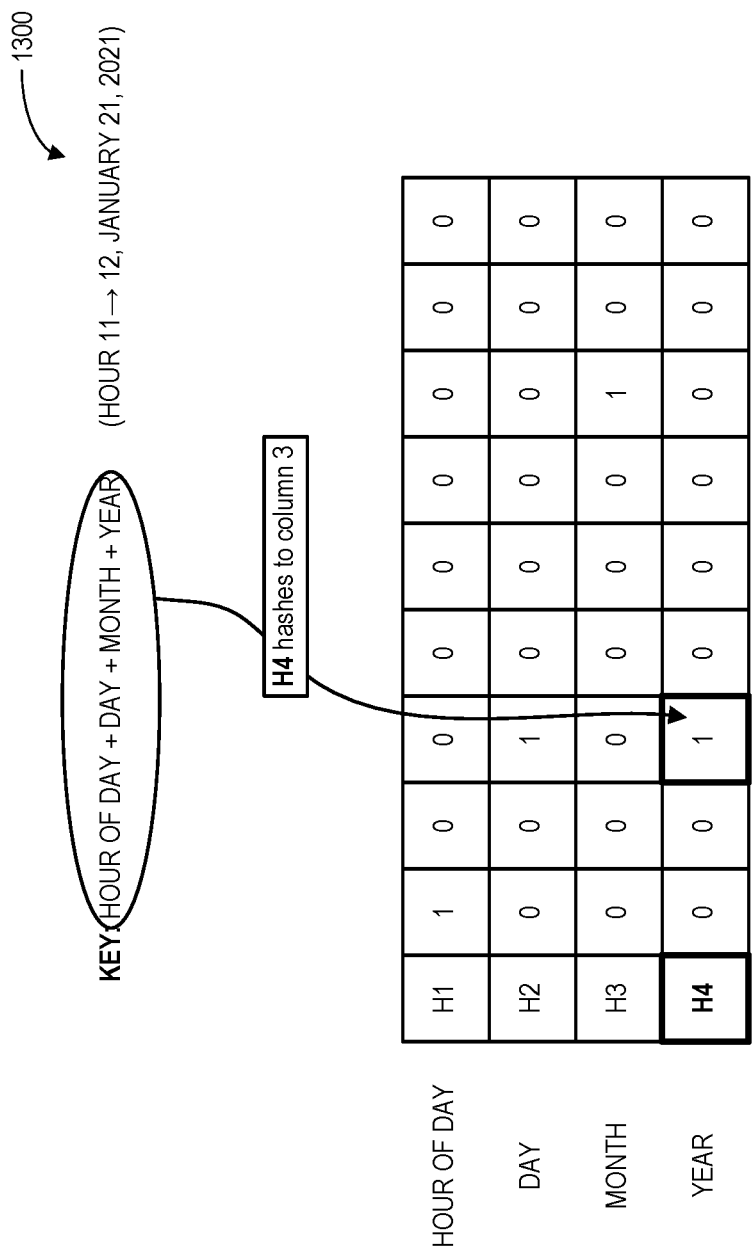

Assume, for example, there is a record with hour value 11→12 for Jan. 21, 2021. The system can then create a key using this hour, day, month, and year combination. FIG. 10 illustrates a count-min sketch 1000 being updated after the hashing algorithm H1 is performed (representing the first row in the sketch 1000) assuming that H1 (row 1) for this key hashes to column 1 (which is incremented from 0 to 1 as illustrated in FIG. 10). FIG. 11 illustrates a count-min sketch 1100 being updated after the hashing algorithm H2 is performed (representing the second row in the sketch 1100) assuming that H2 (row 2) hashes to column 3. FIG. 12 illustrates a count-min sketch 1200 being updated after the hashing algorithm H3 (row 3) is performed (representing the third row in the sketch 1200) assuming that H3 (row 3) hashes to column 7. FIG. 13 illustrates a count-min sketch 1300 being updated after the hashing algorithm H4 is performed (representing the fourth row in the sketch 1300) assuming that H4 (row 4) hashes to column 3.

Figure 14:
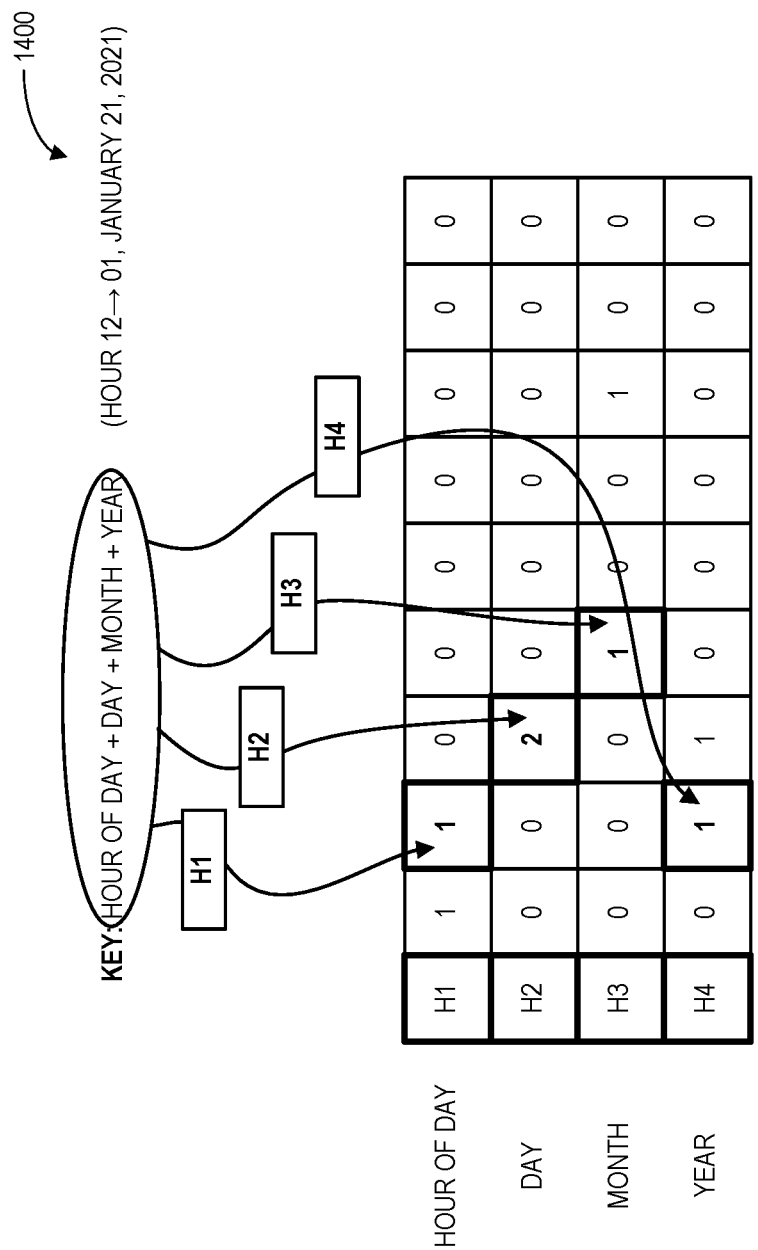
FIG. 14 is a second insertion process according to some embodiments.

FIG. 14 is a second insertion process 1400 according to some embodiments. In this case, an hour value 11→12 for Jan. 21, 2021 is used as the key to update the sketch of FIG. 13. Assume for this update:

H1 (row 1) hashes to column 2,
H2 (row 2) hashes to column 3,
H3 (row 3) hashes to column 4, and
H4 (row 4) hashes to column 2.

After the process 1400 is complete, the table will look like the one illustrated in FIG. 14. This process 1400 continues as new records are received.

Similarly, for storing count of a day (count hits for a day for all tenants, all proxies, all APIs), the system may use the following key combination:

day+month+year to store and append the entries by hashing this key value using H1, H2, H3, and H4 individually.

To handle nested count-min sketches, the system may use a different key. For example, in third level nesting (e.g., FIG. 7) with query as "count hits for an hour of day for all APIs of a tenant and a proxy," the system may use the following key hour of day+day+month+year+tenant+proxy.

Each key at each level would be represented by a different count-min sketch table, which means the example provide has approximately 25 tables to capture this aggregated data.

Figure 15:
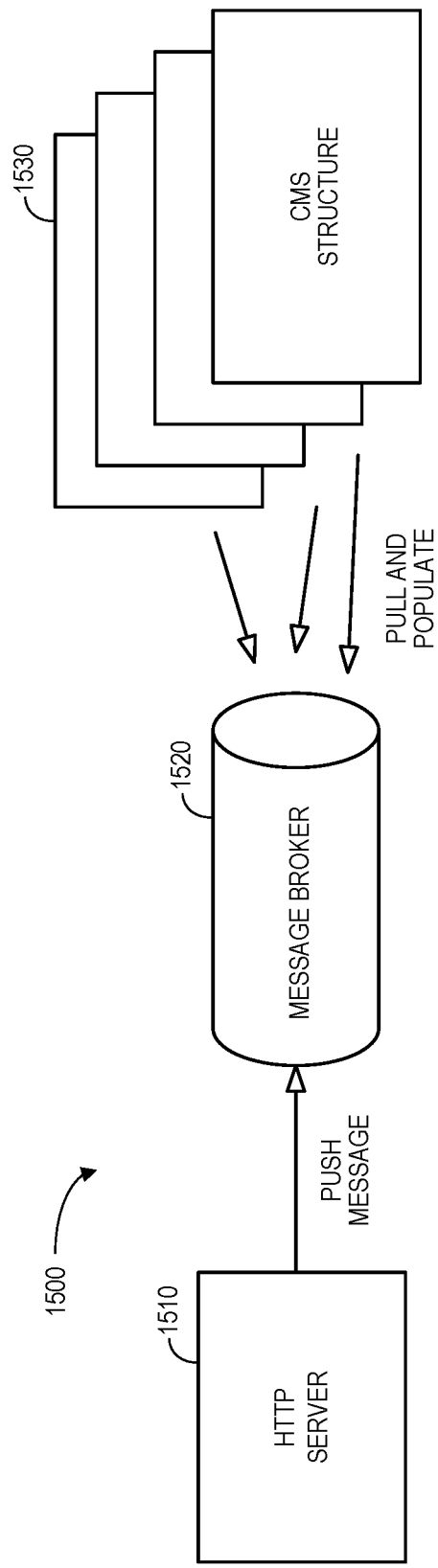
FIG. 15 is a high-level architecture in accordance with some embodiments.

Note that the insertion and extraction of information from a count-min sketch could be performed in a number of different ways. For example, FIG. 15 is a high-level architecture 1500 in accordance with some embodiments. A Hyper-Text Transfer Protocol ("HTTP") server 1510 will receive a request over HTTP protocol and then push messages to a message broker 1520. The message broker 1520 may then pull and populate count-min Sketch ("CMS") data structures 1530. In this way, specific HTTP requests can be pushed into the message broker 1520 and consumers behind-the-scenes can create the count-min sketch structures as needed.

Figure 16:
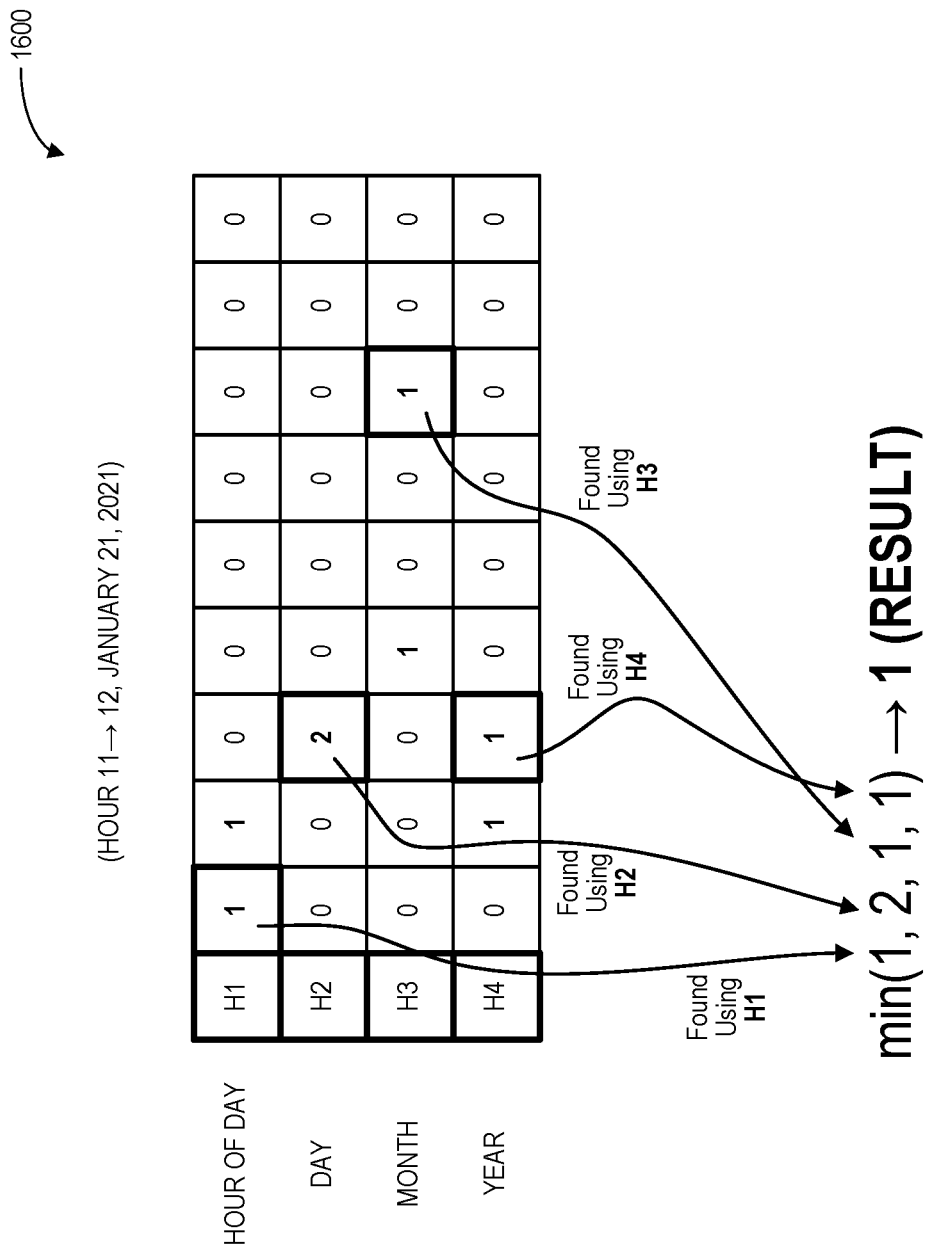
FIG. 16 is a query process according to some embodiments.

A serving architecture may be implemented using a query process 1600 such as the one illustrated in FIG. 16 according to some embodiments. Some embodiments may create a hash table that stores meta-data for mapping a count-min sketch table name to a type of query. Consider an example query seeking records associated with hour 11→12 for Jan. 21, 2021. The hourly count-min sketch looks like the example of FIG. 14. Now the system again hashes the key for hour 11→12 for Jan. 21, 2021 and get (as before):

H1 (row 1) hashes to column 1, which stores a value 1,
H2 (row 2) hashes to column 3, which stores a value 2,
H3 (row 3) hashes to column 7, which stores a value 1,
H4 (row 4) hashes to column 3, which stores a value 1.

The system can then apply the function min(H1, H2, H3, H4) to determine a query result (that is, min (1, 2, 1, 1) using the values from the sketch) to calculate the hit count. In this case, the result turns out to be "1."

Now consider a query that wants to know how many hits happened during the month of February in 2021 for all APIs of a specific tenant and a specific proxy. The hash table understands that this is a third level nesting query based on group by columns and it points to the specific count-min sketch table which should be used to determine a result for that type or kind of query. During serving, the hashes are performed again on the key (month+year+tenant+proxy in this example) and to obtain four values returned from the table (one per hash and row). Then, as per the algorithm, the system determines a min( ) of those four values to determine a query result.

The efficiency of count-min sketch can be demonstrated by reviewing its requirements. The space complexity of CMS is the product of w, d (width and depth, where w is the number of columns and d is the number of hash functions or rows) and the width of the counters that is used. For example, a sketch that has a 0.01% error rate at a probability of 0.01% can be created using ten hash functions and 2000-counter arrays. Assuming the use of 16-bit counters, the overall memory requirement of the resulting sketch's data structure is approximately 40 Kilobytes ("KB"). So, effectively, for the 25 count-min sketches used in the example of FIGS. 4 through 16, embodiments may reduce the storage requirements for one year to 1 Mega-Byte ("MB") of data (which is a factor approximately 1,000 times less than the storage requirement of a typical implementation). Secondly, embodiments described herein O(1) as the query complexity (because as it just ends up in a lookup on a specific CMS table. A downside is that the count-min sketch loses some of the accuracy of data (by a very small percentage). This should be acceptable because the purpose is for aggregates at large volumes.

Figure 17:
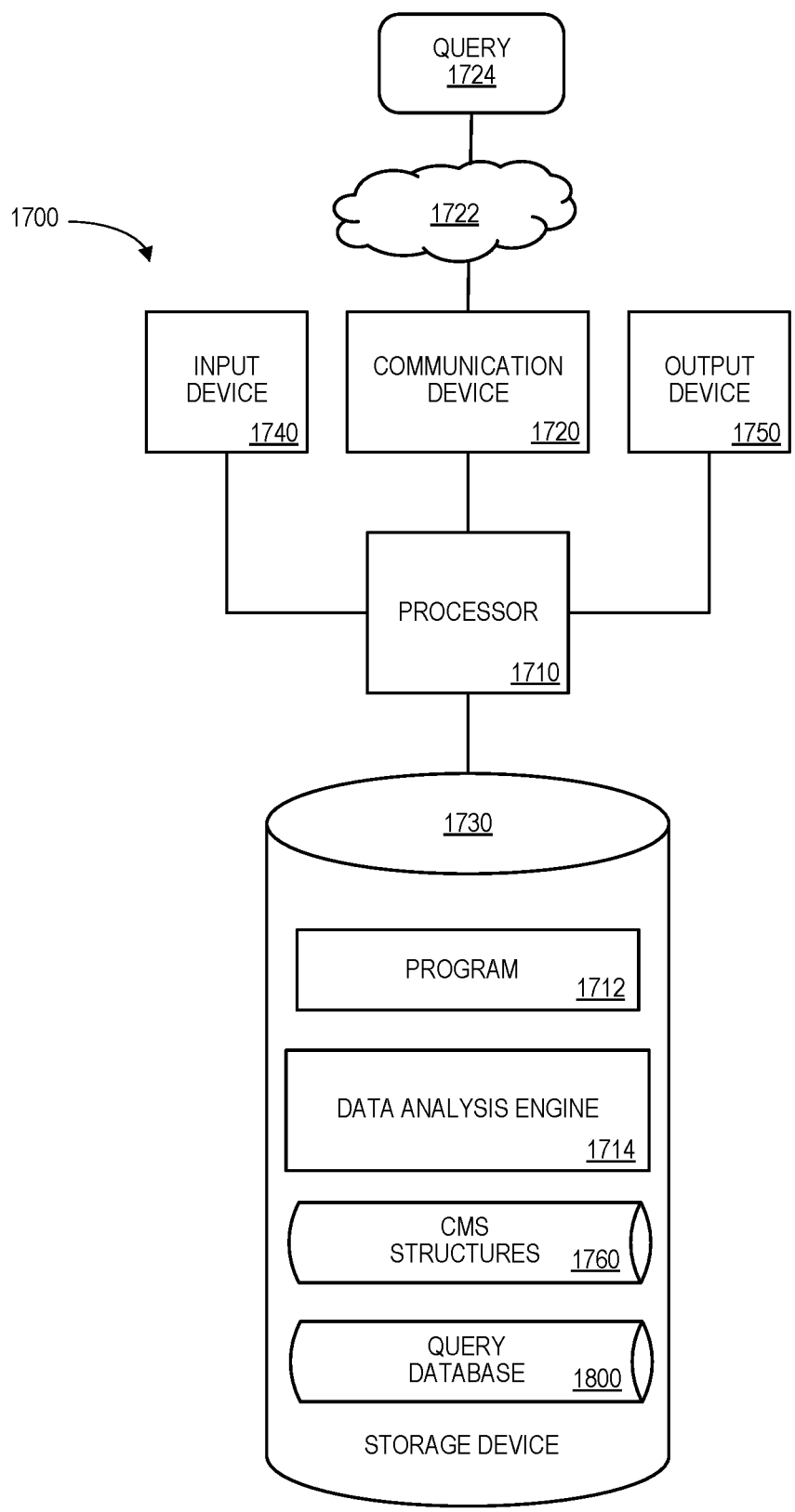
FIG. 17 is an apparatus or platform according to some embodiments.

Note that the embodiments described herein may be implemented using any number of different hardware configurations. For example, FIG. 17 is a block diagram of an apparatus or platform 1700 that may be, for example, associated with the system 100 of FIG. 1 (and/or any other system described herein). The platform 1700 comprises a processor 1710, such as one or more commercially available CPUs in the form of one-chip microprocessors, coupled to a communication device 1720 configured to communicate via a communication network (not shown in FIG. 17). The communication device 1720 may be used to communicate, for example, with one or more remote user platforms or a query generating device 1724 via a communication network 1722. The platform 1700 further includes an input device 1740 (e.g., a computer mouse and/or keyboard to input data about monitored system or data sources) and an output device 1750 (e.g., a computer monitor to render a display, transmit recommendations or alerts, and/or create monitoring reports). According to some embodiments, a mobile device and/or PC may be used to exchange data with the platform 1700.

The processor 1710 also communicates with a storage device 1730. The storage device 1730 can be implemented as a single database, or the different components of the storage device 1730 can be distributed using multiple databases (that is, different deployment data storage options are possible). The storage device 1730 may comprise any appropriate data storage device, including combinations of magnetic storage devices (e.g., a hard disk drive), optical storage devices, mobile telephones, and/or semiconductor memory devices. The storage device 1730 stores a program 1712 and/or data analysis engine 1714 for controlling the processor 1710. The processor 1710 performs instructions of the programs 1712, 1714, and thereby operates in accordance with any of the embodiments described herein. For example, the processor 1710 may receive information about a detected action, including action characteristics. In response to the detected action, insertions are executed by the processor 1710 into a nested probabilistic data structure at multiple levels based on the action characteristics (each insertion incrementing an entry in the data structure selected using the hash functions). The processor 1710 then continues to monitor for detected actions. Upon receipt of a query associated with the monitored action (including a query type), a key and level of nesting associated with the query is determined by the processor 1710 based on the query type. The hash functions are executed on the determined key to retrieve a value from each electronic record in an appropriate nested table, and a minimum of the retrieved values is output by the processor 1710 as a response to the query.

The programs 1712, 1714 may be stored in a compressed, uncompiled and/or encrypted format. The programs 1712, 1714 may furthermore include other program elements, such as an operating system, clipboard application, a database management system, and/or device drivers used by the processor 1710 to interface with peripheral devices.

As used herein, data may be "received" by or "transmitted" to, for example: (i) the platform 1700 from another device; or (ii) a software application or module within the platform 1700 from another software application, module, or any other source.

In some embodiments (such as the one shown in FIG. 17), the storage device 1730 further stores CMS structures 1760 and a query database 1800. An example of a database that may be used in connection with the platform 1700 will now be described in detail with respect to FIG. 18. Note that the database described herein is only one example, and additional and/or different data may be stored therein. Moreover, various databases might be split or combined in accordance with any of the embodiments described herein.

Figure 18:
FIG. 18 illustrates a monitoring database in accordance with some embodiments.

Referring to FIG. 18, a table is shown that represents the query database 1800 that may be stored at the platform 1700 according to some embodiments. The table may include, for example, entries identifying queries received in connection with a cloud computing environment. The table may also define fields 1802, 1804, 1806, 1808 for each of the entries. The fields 1802, 1804, 1806, 1808 may, according to some embodiments, specify: a query identifier 1802, a nesting level 1804, a query type or key 1806, and a query result 1808. The query database 1800 may be created and updated, for example, when a new system is monitored, when results 1808 are generated, etc.

The query identifier 1802 might be a unique alphanumeric label or link that is associated with a received big data analytics query. The nesting level 1804 might indicate an appropriate CMS structure 1760 that should be used to respond to that query. The query type or key 1806 might, for example, indicate which value should be used via hash functions to extract information from the CMS structure 1760. The query result 1808 reflects the extracted information (e.g., after a min ( ) function is performed on the extracted values) that can be output in response to the query.

Figure 19:
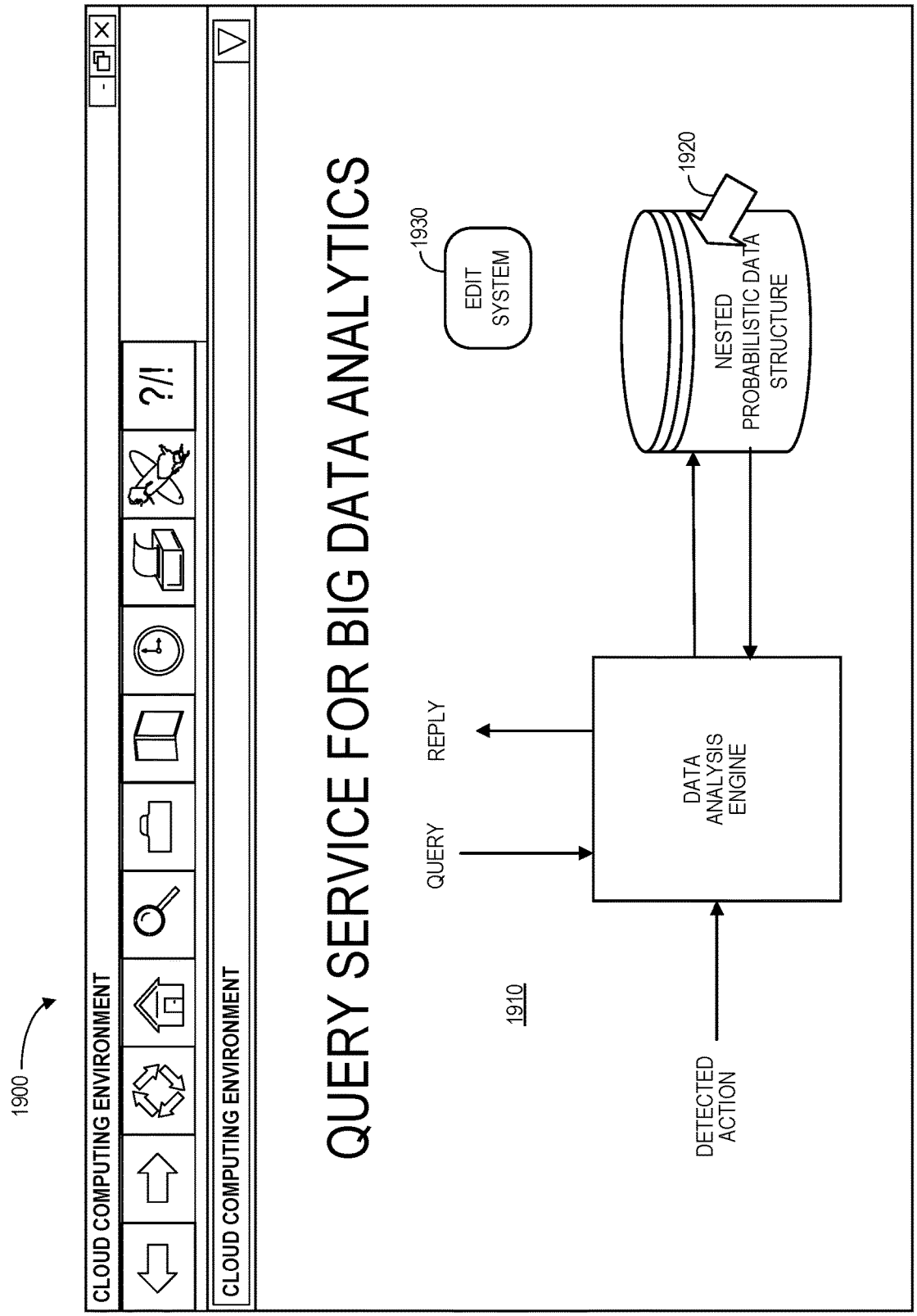
FIG. 19 is a human machine interface display in accordance with some embodiments.

FIG. 19 is a human machine interface display 1900 in accordance with some embodiments. The display 1900 includes a graphical representation 1910 or dashboard that might be used to manage or monitor a query service for big data analytics framework (e.g., associated with a cloud provider). In particular, selection of an element (e.g., via a touchscreen or computer mouse pointer 1920) might result in the display of a popup window that contains configuration data. The display 1900 may also include a user selectable "Edit System" icon 1930 to request system changes (e.g., to investigate or improve system performance).

Thus, embodiments may help perform big data analytics for a cloud computing environment in an efficient and accurate manner. Although some embodiments have been described in connection with the domain of API management, note that embodiments may be extended to other domains as well. For example, some embodiments may be generalized for various domains to make services that can be reused across domains to handle big data (when some degree of approximation is acceptable).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 20:
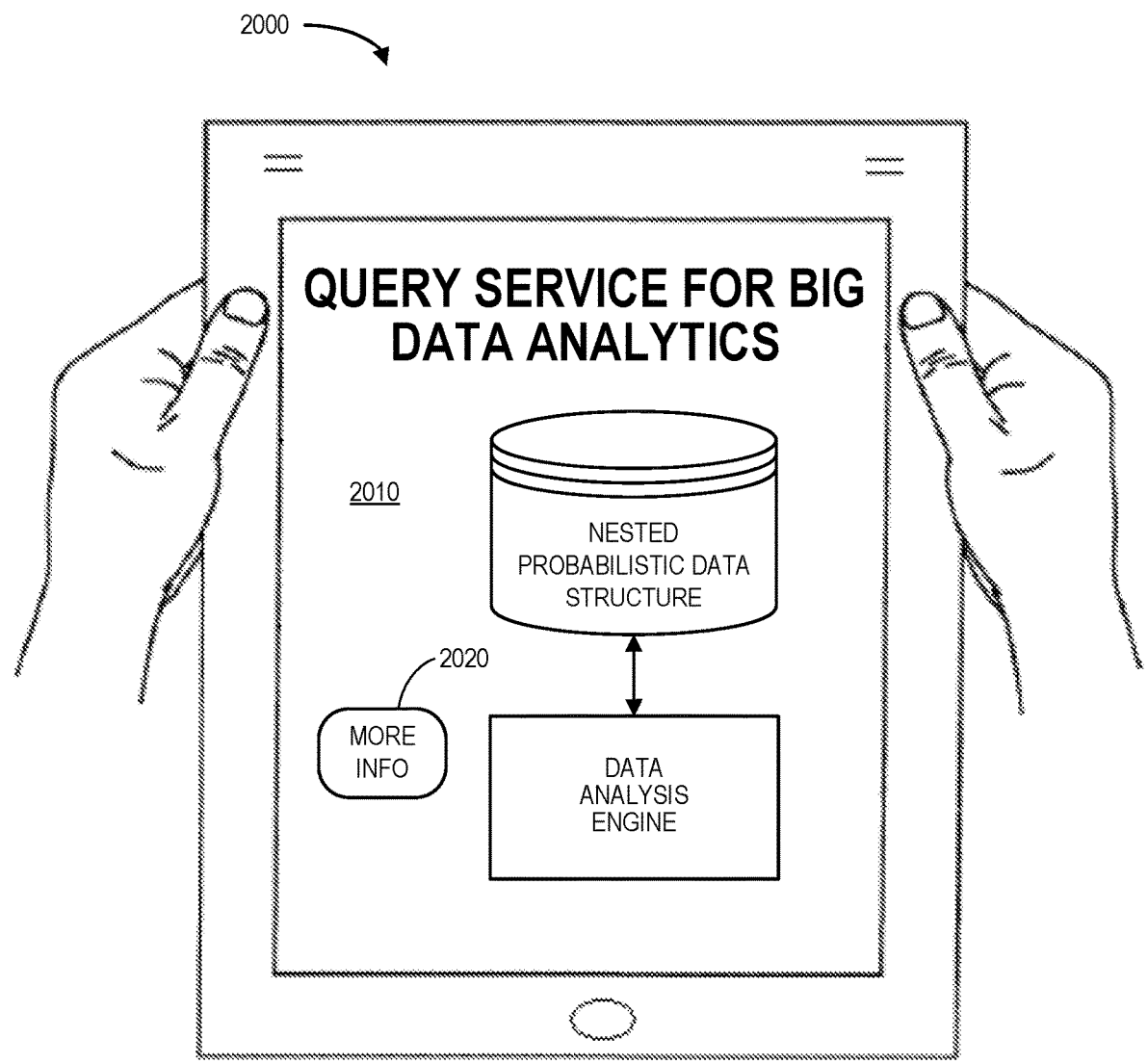
FIG. 20 illustrates a handheld tablet computer according to some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of big data queries, any of the embodiments described herein could be applied to other types of big data situations. Moreover, the displays shown herein are provided only as examples, and any other type of user interface could be implemented. For example, FIG. 20 shows a handheld tablet computer 2000 rendering a query service for big data analytics display 2010 that may be used to view or adjust existing system framework components and/or to request additional data (e.g., via a "More Info" icon 2020).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with a cloud computing environment, comprising:
   a nested probabilistic data structure containing nested count-min sketch tables, each table having electronic records associated with different pairwise independent hash functions; and
   a data analytics engine to monitor an action associated with an Application Programming Interface ("API") management domain and coupled to the nested probabilistic data structure, including:
   a computer processor, and
   a computer memory coupled to the computer processor and storing instructions that, when executed by the computer processor, cause the data analytics engine to:
   (i) receive information about a detected action performed in the cloud computing environment, including action characteristics, (ii) in response to the detected action, execute insertions into the nested probabilistic data structure at multiple levels based on the action characteristics, each insertion incrementing an entry in the nested probabilistic data structure selected using the pairwise independent hash functions, (iii) continue to monitor the cloud computing environment for detected actions, (iv) receive a query associated with the monitored action, including a query type, (v) determine a key and level of nesting associated with the query based on the query type, (vi) execute the pairwise independent hash functions on the determined key to retrieve a value from each electronic record in an appropriate nested count-min sketch table, and (vii) output a minimum of the retrieved values as a response to the query.

2. The system of claim 1, wherein the data analytics is associated with at least one of: (i) data aggregation, and (ii) data averaging.

3. The system of claim 1, wherein the nested count-min sketch tables use a different hashing algorithm for each row to index items into a specific column.

4. The system of claim 3, wherein the data analytics engine is associated with a Hyper-Text Transfer Protocol ("HTTP") server that pushes messages to a message broker, and the message broker pulls and populates information associated with the nested count-min sketch tables.

5. The system of claim 1, wherein the action characteristics comprise all of: (i) a tenant name, (ii) a proxy name, (iii) an Application Programming Interface ("API") name, (iv) a date, and (v) a number of hits.

6. A computer-implemented method associated with a cloud computing environment, comprising:

receiving, by a computer processor of a data analytics engine that monitors an action associated with an Application Programming Interface ("API") management domain, information about a detected action performed in the cloud computing environment, including action characteristics;

in response to the detected action, executing insertions into a nested probabilistic data structure at multiple levels based on the action characteristics, each insertion incrementing an entry in the nested probabilistic data structure selected using pairwise independent hash functions, wherein the nested probabilistic data structure contains nested count-min sketch tables, each table having electronic records associated with different pairwise independent hash functions;

continuing to monitor the cloud computing environment for detected actions;

receiving a query associated with the monitored action, including a query type;

determining a key and level of nesting associated with the query based on the query type;

executing the pairwise independent hash functions on the determined key to retrieve a value from each electronic record in an appropriate nested count-min sketch table; and outputting a minimum of the retrieved values as a response to the query.

7. The method of claim 6, wherein the data analytics is associated with at least one of: (i) data aggregation, and (ii) data averaging.

8. The method of claim 6, wherein the nested count-min sketch tables use a different hashing algorithm for each row to index items into a specific column.

9. The method of claim 7, wherein the data analytics engine is associated with a Hyper-Text Transfer Protocol ("HTTP") server that pushes messages to a message broker, and the message broker pulls and populates information associated with the nested count-min sketch tables.

10. The method of claim 6, wherein the action characteristics comprise all of: (i) a tenant name, (ii) a proxy name, (iii) an Application Programming Interface ("API") name, (iv) a date, and (v) a number of hits.

11. A system associated with a cloud computing environment, comprising:

a nested count-min sketch data structure containing nested tables, each table having electronic records associated with different pairwise independent hash functions; and a data analytics engine to monitor an action associated with an Application Programming Interface ("API") management domain and coupled to the nested count-min sketch data structure, including:

a computer processor, and a computer memory coupled to the computer processor and storing instructions that, when executed by the computer processor, cause the data analytics engine to:

(i) receive information about a detected action performed in the cloud computing environment, including action characteristics, (ii) in response to the detected action, execute insertions into the nested probabilistic data structure at multiple levels based on the action characteristics, each insertion incrementing an entry in the nested probabilistic data structure selected using the pairwise independent hash functions, and (iii) continue to monitor the cloud computing environment for detected actions.

12. The system of claim 11, wherein the data analytics is associated with at least one of: (i) data aggregation, and (ii) data averaging.

13. The system of claim 11, wherein the nested count-min sketch data structure comprises nested tables that use a different hashing algorithm for each row to index items into a specific column.

14. The system of claim 13, wherein the data analytics engine is associated with a Hyper-Text Transfer Protocol ("HTTP") server that pushes messages to a message broker, and the message broker pulls and populates information associated with the nested count-min sketch tables.

15. The system of claim 11, wherein the action characteristics comprise all of: (i) a tenant name, (ii) a proxy name, (iii) an Application Programming Interface ("API") name, (iv) a date, and (v) a number of hits.

* * * * *